United States Patent
Hartmann et al.

(10) Patent No.: US 11,014,766 B2
(45) Date of Patent: May 25, 2021

(54) CONTINUOUS CONVEYOR FOR CONVEYING OBJECTS, AND OBJECT-CONVEYING FACILITY HAVING A CONTINUOUS CONVEYOR

(71) Applicants: Bernd Hartmann, Grafschaft-Leimersdorf (DE); Kai-Ulrich Ventz, Hildesheim (DE); René Schällig, Hildesheim (DE); Jana Mönster, Hannover (DE)

(72) Inventors: Bernd Hartmann, Grafschaft-Leimersdorf (DE); Kai-Ulrich Ventz, Hildesheim (DE); René Schällig, Hildesheim (DE); Jana Mönster, Hannover (DE)

(73) Assignee: Deutsche Post AG, Bonn (DE)

( * ) Notice: Subject to any disclaimer, the term of this patent is extended or adjusted under 35 U.S.C. 154(b) by 0 days.

(21) Appl. No.: 16/723,558

(22) Filed: Dec. 20, 2019

(65) Prior Publication Data
US 2020/0198900 A1 Jun. 25, 2020

(30) Foreign Application Priority Data
Dec. 20, 2018 (DE) .................... 10 2018 133 052.9

(51) Int. Cl.
*B65G 37/00* (2006.01)
*B65G 47/56* (2006.01)
(Continued)

(52) U.S. Cl.
CPC ......... *B65G 47/643* (2013.01); *B65G 37/005* (2013.01); *B65G 41/003* (2013.01)

(58) Field of Classification Search
CPC ...... B65G 37/00; B65G 47/56; B65G 47/643; B65G 41/003; B65G 37/005
(Continued)

(56) References Cited

U.S. PATENT DOCUMENTS 3,403,799 A * 10/1968 Sindzinski ............ B66B 11/006
  414/564
4,205,934 A    6/1980 Pantin et al.
(Continued)

FOREIGN PATENT DOCUMENTS

CN      107 416 424 A    12/2017
CN      107 458 819 A    12/2017
(Continued)

*Primary Examiner* — Douglas A Hess
(74) *Attorney, Agent, or Firm* — Reinhart Boerner Van Deuren P.C.

(57) ABSTRACT

A description of a continuous conveyor is provided. The continuous conveyor includes a front segment, a central segment and a rear segment. At least the central segment has a conveying device for conveying objects and at least one height-adjustment device for adjusting the height of at least the conveying device from at least one lower, use position for conveying objects into an upper position. In a conveying position, the front segment, the conveying device of the central segment and the rear segment are arranged one behind the other in at least one conveying direction. Provision is made for a free space beneath the conveying device of the central segment in the upper position. The free space has a height of at least 160 cm, a width of at least 70 cm, and a depth corresponding to the width of the conveying device of the central segment.

14 Claims, 5 Drawing Sheets

(51) Int. Cl.
*B65G 47/64* (2006.01)
*B65G 41/00* (2006.01)

(58) Field of Classification Search
USPC .......................... 198/369.6, 369.7, 435, 607
See application file for complete search history.

(56) References Cited

U.S. PATENT DOCUMENTS

| | | | | |
|---|---|---|---|---|
| 4,712,963 A * | 12/1987 | Kondo | ................... | B65G 1/045 198/346.1 |
| 4,867,299 A * | 9/1989 | Fukuoka | .............. | B65G 47/643 198/435 |
| 5,568,857 A | 10/1996 | Chen et al. | | |
| 5,577,597 A * | 11/1996 | Kakida | ................... | B65G 37/02 198/465.1 |
| 5,909,796 A * | 6/1999 | Soldavini | ............. | B65G 47/647 198/369.2 |
| 6,216,847 B1 * | 4/2001 | Schmidt | ................. | B65G 47/53 198/463.3 |
| 6,394,257 B1 * | 5/2002 | Wheeler | .............. | B65G 47/643 198/369.6 |
| 6,669,003 B2 * | 12/2003 | Vassel | .................... | B65G 13/10 198/435 |
| 6,681,916 B2 * | 1/2004 | Hiroki | .................. | B65G 49/064 198/347.1 |
| 7,275,635 B2 * | 10/2007 | Enya | ....................... | B65G 37/02 198/463.2 |
| 7,575,635 B2 * | 8/2009 | Perttila | .................. | B05C 5/0275 118/315 |
| 7,699,158 B2 * | 4/2010 | Aust | .................... | B65G 47/643 198/369.1 |
| 8,146,729 B1 * | 4/2012 | Wagner | ................... | B66B 17/14 198/369.6 |
| 8,413,578 B2 * | 4/2013 | Doyle | ................ | H05K 13/0061 101/126 |
| 8,997,969 B2 * | 4/2015 | Plakolm | ................. | B23Q 7/005 198/346.2 |
| 9,022,204 B2 * | 5/2015 | Wang | ..................... | B65G 47/643 198/435 |
| 9,422,017 B2 * | 8/2016 | Waki | ...................... | B62D 65/18 |
| 9,637,363 B2 * | 5/2017 | Mohr | .................... | B65G 35/06 |
| 9,878,857 B2 * | 1/2018 | Itoh | ........................ | B65G 47/54 |
| 10,494,177 B1 * | 12/2019 | Cioclei | .................... | B65G 1/10 |
| 2015/0151930 A1 | 6/2015 | Kollmuss et al. | | |
| 2016/0264356 A1 | 9/2016 | Wakizaka | | |

FOREIGN PATENT DOCUMENTS

| | | |
|---|---|---|
| CN | 107 857 047 A | 3/2018 |
| DE | 203 20 635 U1 | 2/2005 |
| GB | 1 208 965 A | 10/1970 |
| JP | S57-151704 U | 9/1982 |
| JP | H06-171740 A | 6/1994 |
| JP | H06-316338 A | 11/1994 |

* cited by examiner

CONTINUOUS CONVEYOR FOR CONVEYING OBJECTS, AND OBJECT-CONVEYING FACILITY HAVING A CONTINUOUS CONVEYOR

CROSS-REFERENCE TO RELATED PATENT APPLICATION

This patent application claims priority to German Application No. 10 2018 133 052.9, filed Dec. 20, 2018, the entire teachings and disclosure of which are incorporated herein by reference thereto.

FIELD

The invention relates to a continuous conveyor, in particular belt conveyor or roller conveyor, for conveying objects, having a front conveying segment, a central conveying segment and a rear conveying segment, wherein at least the central conveying segment has a conveying device for conveying objects and at least one height-adjustment device for adjusting the height of at least the conveying device from at least one lower, use position for conveying objects into an upper position in relation to the front conveying segment and the rear conveying segment, wherein, in a conveying position, the front conveying segment, the conveying device of the central conveying segment and the rear conveying segment are arranged one behind the other in at least one conveying direction. The invention also relates to an object-conveying facility having at least one such continuous conveyor.

BACKGROUND

Very different continuous conveyors, which are also used for very different purposes, are known. In many cases, the continuous conveyors serve to convey objects, which can be wrapped goods and/or items. There are basically no limitations as far as the size, shape and type of such objects are concerned, but the objects in question here are intended to be, in particular, those which can be carried, and handled, by a person. In particular, the objects can be items, such as packages, in particular so-called parcels or packets, which are used separately and are sorted, and distributed, in distribution centres. Packages can be considered here, as required, to be wrapped items.

Objects can be conveyed, in general, for different reasons. For example, the objects can be conveyed for sorting, packaging, labelling, customization or transshipment purposes. Corresponding conveying installations are installed for this purpose, usually in factories or object-conveying facilities. In the case of parcels, use is also made here of so-called distribution centres, in which the parcels are wrapped, sorted and/or distributed. Depending on the task to be accomplished, the conveying system here requires, quite fundamentally, a not inconsiderable amount of space. Since the amount of space available is usually limited and the task of creating space basically also constitutes a not inconsiderable cost factor, the compactness of the conveying installations has to meet increasingly stringent requirements.

In order to render the conveying system ever more compact, it is increasingly common practice to cut back on space for paths on which people can walk through the conveying installations. This can even be tolerated, in principle, since increasingly few staff are required for operating the conveying installations. On the other hand, it is nevertheless necessary for certain installation parts to be accessible for maintenance and repair purposes. Moreover, it has to be ensured that rescue and escape routes are available to a sufficient extent in order to allow people to leave a certain installation region quickly and to allow good accessibility to certain installation parts where accidents involving personal injury can occur. Against this background, there are increasing limits in respect of rendering the conveying system more compact, or more and more outlay is required in order to render the conveying system more compact.

BRIEF SUMMARY

The present invention is therefore based on the object of configuring, and developing, the continuous conveyors and the object-conveying facilities of the type mentioned in the introduction, and described more specifically above, such that the amount of space required can be reduced, and rendered more compact, without excessive disadvantages in respect of maintenance and safety having to be incurred.

This object is achieved in the case of a continuous conveyor according to the present disclosure in that a free space, in particular a through-passage, is provided beneath the conveying device of the central conveying segment in the upper position, said free space having a height of at least 160 cm, preferably at least 175 cm, in particular at least 190 cm, a width of at least 70 cm, preferably at least 90 cm, in particular at least 110 cm, and a depth corresponding to the width of the conveying device of the central conveying segment.

The aforementioned object is also achieved according to the present disclosure by an object-conveying facility, in particular an object-conveying hall, having at least one continuous conveyor as described herein, wherein a through-passage is provided, in particular in a direction transverse to the conveyor track and/or conveying direction, beneath the conveying device of the central conveying segment in the upper position, said through-passage having a height of at least 160 cm, preferably at least 175 cm, in particular at least 190 cm, and a width of at least 70 cm, preferably at least 90 cm, in particular at least 110 cm, and a depth corresponding to the width of the conveying device of the central conveying segment.

Continuous conveyors are understood to mean an on-site conveying installation which can generate a continuous stream of conveyed objects along predetermined routes or conveyor tracks, to be precise basically irrespective of the quantity of objects which are to be conveyed. Continuous conveyors and the objects which are to be conveyed move, at least in principle, continuously or constantly and are therefore not governed by transporting cycles. Continuous conveyors are usually floor-mounted and capable of horizontal, inclined and vertical transportation of the goods to be transported. They often require a lot of space on the floor and have a defined transporting path. Continuous conveyors are preferably designed in the form of mechanical conveyors, to be precise in the form of a driven roller conveyor, belt conveyor and/or chain conveyor. In contrast, gravity conveyors can be designed in the form of spiral chutes or roller tracks. In the present case, however, flow conveyors and passenger conveyors should be understood to be continuous conveyors to a very limited extent, if at all.

The present continuous conveyors have different conveying segments for conveying the objects. At least a front conveying segment, a central conveying segment and a rear conveying segment are provided, to be precise one behind the other in at least one conveying direction, and therefore the objects can be transferred from the front conveying segment to the central conveying segment and, from there, to the rear conveying segment. The conveying device of the central conveying segment here is located in a lower, use position. This position is a use position because the conveying device in this position performs its main, intended task, namely that of conveying objects. In addition to the conveying device, the central conveying segment also has a height-adjustment device, which serves to adjust the height of the conveying device. The height-adjustment device can adjust the conveying device at least from a lower, use position into at least one upper position. The at least one upper position can likewise be a use position for conveying objects. However, this is not necessarily the case. The height-adjustment means here is designed such that the conveying device of the central conveying segment can be adjusted in height in relation to the front conveying segment and the rear conveying segment.

The invention has found here that paths in the conveying system or conveying installation can be opened up, as required, when needed. When these paths are not needed, however, it is possible for the corresponding space to be used for conveying objects. When the at least one upper position of the conveying device of the central conveying segment is a use position, it is even possible, when the corresponding path is required, for further objects to be conveyed, albeit along a different conveyor track. In addition, it is also possible for different objects to be conveyed as required. However, the lower, use position of the conveying device cannot be used if the corresponding path is to be freed.

In order for a height-adjustment means to create a path for a person in the conveying installation, the latter is provided such that a free space is provided beneath the conveying device of the central conveying segment in the upper position, said free space having a height of at least 160 cm, preferably at least 175 cm, in particular at least 190 cm, a width of at least 70 cm, preferably at least 90 cm, in particular at least 110 cm, and a depth corresponding to the width of the conveying device of the central conveying segment. If the conveying device does not have a constant width, the depth of the free space should correspond preferably to the width of the conveying device in the region of the free space. This allows a person to get beneath the conveying device of the central conveying segment without having to crawl. It may be necessary for the corresponding person to bend down slightly or bow his head. Otherwise, however, the person can stand or walk beneath the conveying device. It is particularly preferred here if the free space beneath the conveying device of the central conveying segment forms a through-passage, allowing someone to walk through beneath the conveying device of the central conveying segment. The through-passage here is opened preferably in a direction which is oriented at least essentially transversely to the conveying direction or to the conveyor track of the conveying device. This makes it possible in certain situations, with the conveying device raised, for someone to walk through beneath the conveying device of the central conveying segment. The through-passage can further preferably be designed here in the form of part of an escape route and/or a rescue route.

A continuous conveyor, or a row of continuous conveyors, according to one of Claims 1 to 13, can be provided in the object-conveying facility. In this case, a through-passage is provided, in particular in a direction transverse to the conveyor track and/or conveying direction, beneath the conveying device of the central conveying segment in the upper position, said through-passage having a height of at least 160 cm, preferably at least 175 cm, in particular at least 190 cm, and a width of at least 70 cm, preferably at least 90 cm, in particular at least 110 cm, and a depth corresponding to the width of the conveying device of the central conveying segment. If the conveying device does not have a constant width, the depth of the free space should correspond preferably to the width of the conveying device in the region of the free space.

In particular, the objects can be, quite generally, items, such as packages, in particular so-called parcels or packets, which are used separately and are sorted, and distributed, in distribution centres. Packages can be considered here, for example, to be wrapped items.

In the case of a first particularly preferred configuration of the continuous conveyor, at least one conveying surface of the front conveying segment, at least one conveying surface of the conveying device of the central conveying segment in the lower, use position and at least one conveying surface of the rear conveying segment form an at least essentially continuous conveyor track for conveying objects from the front conveying segment, via the central conveying segment, to the rear conveying segment. This if required at least essentially aligned arrangement of the conveying surfaces in relation to one another provides for a continuous conveying stream of objects along the conveying segments. It is possible here to have a single arrangement in which the conveying surfaces of the conveying segments in the conveying device are arranged along a continuous conveyor track or at least essentially in alignment in relation to one another. It is also possible, however, to have a plurality of arrangements in which this is the case. For example, the front conveying segment and the rear conveying segment can have a plurality of conveying surfaces one above the other. The conveying device of the central conveying segment can then be adjusted, as required, by the height adjustment between the different conveying surfaces of the front conveying segment and of the rear conveying segment, and therefore the conveying surface of the conveying device can be arranged in alignment at least essentially with different conveying surfaces of the adjacent conveying segments. This therefore results in at least one lower use position and at least one upper use position of the conveying device of the central conveying segment. However, it is also conceivable for not just the central conveying segment, but also the front conveying segment and/or the rear conveying segment, to have a height-adjustable conveying device. It is then possible for the same conveying surfaces of the conveying devices to be arranged at least essentially in alignment in relation to one another, to be precise in the manner of a common conveyor track in each case, at different heights or in different use positions.

In particular for the case where the adjustment of the conveying device of the central conveying segment outside normal operation of the continuous conveyor provides for adjustment into the at least one upper position, the at least one upper position of the conveying device of the central conveying segment can be a not-in-use position, in which objects are not conveyed. This comes into question, in particular, when the conveying operation of the objects is interrupted in any case for repair or maintenance purposes. A corresponding interruption can also be expedient in the cases where the height adjustment of the conveying device of the central conveying segment is intended to create an escape route and/or rescue route. Under the aforementioned conditions, the conveying device can be readily adjusted into an upper position, which frees up sufficient space, even if it is not possible, in the upper position, for the objects still to be conveyed along the continuous conveyor with the aid of the conveying device of the central conveying segment. It can then be accepted that the at least one conveying surface of the conveying device of the central conveying segment in the upper position together with the conveying surfaces of the front conveying segment and of the rear conveying segment do not form an at least essentially continuous conveyor track for conveying objects from the front conveying segment, via the central conveying segment, to the rear conveying segment. However, this does ensure that sufficient space is created for example in order for maintenance or repair work to be carried out on the continuous conveyor or for an escape route or rescue route to be opened up.

In order that the height-adjustment means functions reliably when required, it is recommended if the height-adjustment device for adjusting the height of the conveying device of the central conveying segment is designed in the form of a purely mechanical height-adjustment device for the purely mechanical, preferably manual, height adjustment of the conveying device of the central conveying segment. This is even more so the case when the height adjustment of the conveying device of the central conveying segment is to take place in an emergency situation, in order to free a rescue route and/or an escape route. This is because, in a situation such as this, the voltage supply can end up being shut off. An electric drive would then be capable of functioning only if additional equipment were provided, if at all.

For purely mechanical adjustment of the conveying device of the central conveying segment, at least one handle can be provided for the manual height adjustment of the conveying device of the central conveying segment. For the case where it should be possible for someone to walk in opposite directions on the path which is freed by the height adjustment, the conveying device of the central conveying segment can have in each case at least one handle for the manual height adjustment of the conveying device of the central conveying segment on opposite sides, in particular as seen in respect of the conveyor track for conveying objects. This also applies as an alternative, or in addition, to the case where the conveying device of the central conveying segment is to be raised manually, via a handle, from one side of the conveying device and lowered again manually from the other side of the conveying device.

The path can be created, as required, in a particularly straightforward and reliable manner if at least one foot with a standing surface, said foot being assigned in particular to the central conveying segment, is provided for positioning the continuous conveyor on an underlying surface. It can thus be ensured that the predetermined height of the free space generated by the height adjustment of the conveying device of the central conveying segment is also reached. As an alternative, or in addition, it is also possible for at least part of an underside of the conveying device of the central conveying segment to be arranged at least 160 cm, preferably at least 175 cm, in particular at least 190 cm above the standing surface, to be precise when the conveying device is arranged in the upper position. This creates a sufficient amount of free space at least in some regions beneath the conveying device. However, provision can also be made for at least part of the underside of the conveying device of the central conveying segment in the upper position to be arranged at most 240 cm, preferably at most 220 cm, in particular at most 200 cm above the standing surface. This avoids excessive equipment-related outlay and ensures that the height adjustment can take place reliably for a variety of applications.

As an alternative, or in addition, the central conveying segment can have in each case at least one leg at the front and rear, as seen in the conveying direction of the objects, this being conducive to the envisaged free space being created in a reliable manner. This applies, in particular, when the length of the legs beneath a portion of the conveying device which extends between the legs is at least 160 cm, preferably at least 175 cm, in particular at least 190 cm. Ultimately, the height of the free space is reliably defined in this way. However, it can also be preferred here if the corresponding leg length is at most 240 cm, preferably at most 220 cm, in particular at most 200 cm, in order for unnecessary outlay and unnecessary measures to be avoided.

In order to provide for straightforward and reliable height adjustment, the height-adjustment device can have at least one counterweight for at least partially compensating for the weight of the conveying device of the central conveying segment when the conveying device is being adjusted from the lower, use position into the upper position, and back. It is then necessary for the user to apply, for example, just a fraction of the force for raising and/or lowering the at least one weight of the conveying device of the central conveying segment. It is particularly expedient here, for the purpose of straightforward and reliable adjustment of the conveying device of the central conveying segment, if the difference in mass between the conveying device and the at least one counterweight is less than 20 kg, preferably less than 15 kg, in particular less than 10 kg.

As an alternative, or in addition, the central conveying segment can have at least one automatic arresting device for automatically arresting the conveying device of the central conveying segment in the lower, use position and/or in the upper position. All that is then necessary is for the user to adjust the conveying device into the at least one upper position and/or into the at least one lower, use position. Arresting action is then effected there, accidental adjustment of the conveying device of the central conveying segment being avoided as a result.

In order that the height adjustment can be easily carried out by different people even in an emergency situation, a preferred height-adjustment device is designed such that the operation of raising the conveying device from the lower, use position into the upper position and/or the operation of lowering the same from the upper position into the lower, use position require/requires a force of less than 300 N, preferably less than 260 N, in particular less than 220 N.

It can be advantageous for an expedient conveying operation of the objects and/or integration of the continuous conveyor in an existing conveying installation if the conveying device of the central conveying segment is designed to be rectilinear or curved along the conveyor track and/or if the conveyor track of the conveying device of the central conveying segment is designed to be rectilinear or curved. The curved configuration of the at least one conveyor track can be in the form here of a circular arc, in order to provide for uniform and careful conveying of the objects.

In order that the height adjustment of the conveying device of the conveying segment does not adversely affect the conveying operation of the objects, provision is made, as required, for the conveying device of the central conveying segment to have a motor drive for driving the conveying device for conveying the objects along the conveyor track assigned to the conveying device of the conveying segment.

Quite independently of this, it is particularly expedient, for the sake of simplicity and reliability, if the conveying device of the central conveying segment has a roller conveyor and/or a belt conveyor. The roller conveyor here can be motor-driven. However, it is also possible for the roller conveyor to provide for a gravity-driven conveying operation of the objects. In addition, it is preferred, for the sake of simplicity, if the front conveying segment and/or the rear conveying segment also have a roller conveyor and/or a belt conveyor. This can also help provide a careful conveying operation of the objects.

It is possible here to achieve, as required, a higher level of functionality and/or flexibility for the use of the continuous conveyor if the front conveying segment has a conveying device, and/or the rear conveying segment has a conveying device, for conveying the objects. This is even more so the case when the front conveying segment has a height-adjustment device for adjusting the height of the conveying device of the front conveying segment and/or the rear conveying segment has a height-adjustment device for adjusting the height of the conveying device of the rear conveying segment. This means that very different conveying tasks can be accomplished in a very confined amount of space, without it being necessary to do without escape routes, rescue routes and/or paths provided for carrying out maintenance and/or repair work.

In the case of a first particularly preferred configuration of the object-conveying facility, at least part of the underside of the conveying device of the central conveying segment in the upper position is arranged at least 160 cm, preferably at least 175 cm, in particular at least 190 cm above the floor of the object-conveying facility beneath the conveying device, in order for it to be possible to use the free space expediently in the form of an escape route, a rescue route and/or path for maintenance and/or repair purposes. In order to improve the use capability and to limit the equipment-related outlay, it can be expedient for at least part of the underside of the conveying device of the central conveying segment in the upper position to be arranged at most 240 cm, preferably at most 220 cm, in particular at most 200 cm above the floor of the object-conveying facility beneath the conveying device.

BRIEF DESCRIPTION OF THE DRAWING

The invention will be explained in more detail hereinbelow with reference to a drawing, which merely illustrates exemplary embodiments and in which.

DETAILED DESCRIPTION

Figure 1A:
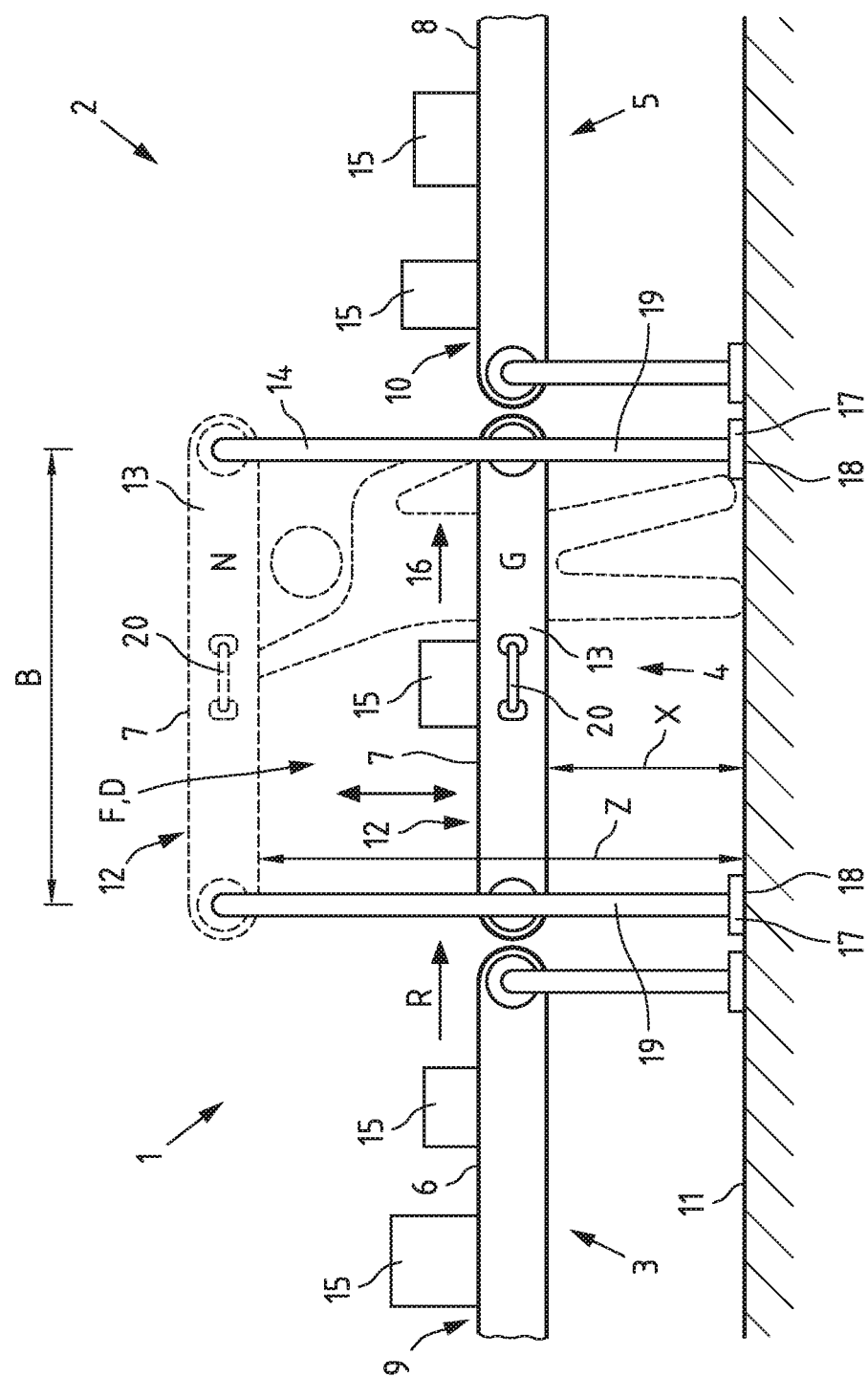
FIGS. 1A-B respectively show a schematic side view of a first continuous conveyor according to the invention and of a second continuous conveyor according to the invention in a corresponding object-conveying facility according to the invention.

FIG. 1A illustrates a schematic side view of a continuous conveyor 1 in an object-conveying facility 2. The continuous conveyor 1 constitutes a belt conveyor made up of a front conveying segment 3, a central conveying segment 4 and a rear conveying segment 5, wherein each of the conveying segments 3,4,5 has a separate, circulating conveyor belt 6,7,8. The front conveying segment 3 and the rear conveying segment 5 each have a conveying surface 9,10, the latter being located at a fixed, predetermined height X above the floor 11 of the object-conveying facility 2. The conveying surface 12 of the central conveying segment 4 is formed by a conveying device 13 of the central conveying segment 4. The conveying device 13 of the central conveying segment 4 is provided here such that it can be adjusted in height via a height-adjustment device 14 of the central conveying segment 4. The conveying device 13 can be adjusted at least from a lower, use position G into an upper, not-in-use position N, in which the conveying device 13 is illustrated schematically using dashed lines. In the lower, use position G, the conveying surface 12 of the conveying device 13 of the central conveying segment 4 serves to convey objects 15 along a conveyor track 16, which in the present case is formed in a single plane. In addition, the conveying direction R here is provided from left to right, as is illustrated by the arrow. The front conveying segment 3, the central conveying segment 4 and the rear conveying segment 5 are arranged one behind the other in the conveying direction R and along the conveyor track 16, to be precise at least with the conveying device 13 of the central conveying segment 4 in the lower, use position G.

In the latter case, the conveying surfaces 9,10,12 of the conveying segments are oriented at least approximately in a single plane and at least approximately in alignment in relation to one another. In other words, the conveying device 13 of the central conveying segment 4 in the lower, use position G serves to convey the objects 15 along the conveyor track 16. In the upper, not-in-use position N, the conveying device 13 of the central conveying segment 4 does not serve to convey the objects 15, for which reason it is then also the case that there are no mutually aligned conveying surfaces 9,10,12 of the conveying segments 3,4,5 provided. Rather, in the upper, not-in-use position N, there is an offset in height between the conveying surfaces 9,12; 12,10 of at least two conveying segments 3,4,5, in this case of all three conveying segments 3,4,5, and this does not allow the objects 15 to be conveyed along a conveyor track 16 along the continuous conveyor 1. In the upper, not-in-use position N, the conveying device 13 serves to create a free space F beneath it.

The free space F is therefore arranged beneath the conveying device 13 of the central conveying segment 4 arranged in the upper, not-in-use position N. In the case of the exemplary embodiment illustrated, the free space F can be used, in addition, as a through-passage D. The free space F which is illustrated, and to that extent preferred, here has a height Z of at least 190 cm and a width B of at least 90 cm. In addition, the free space F extends over the entire width of the conveying device 13 in a direction perpendicular or transverse to the conveyor track 16 and/or to the conveying direction R.

In the case of the continuous conveyor 1 which is illustrated, and to that extent preferred, the central conveying segment 4, or the conveying device 13 of the central conveying segment 4, is assigned two feet 17, each provided with a standing surface 18. The continuous conveyor 1 here stands on the floor 11 of the object-conveying facility 2 by way of the standing surfaces 18. The feet 17 are here assigned legs 19, which are assigned to the front end and the rear end of the central conveying segment 13, as seen in the conveying direction R. For the case where the conveying device 13 is arranged in the upper, not-in-use position N, the two legs 19 have located between them a portion of the conveying device 13 beneath which the legs 19 are at least 175 cm long. The standing surfaces 18 of the feet 17 on the facility floor 11 are spaced apart vertically by 190 cm from at least part of the underside of the conveying device 13 of the central conveying segment 4. However, the underside of the conveying device 13 of the central conveying segment 4 in the upper, not-in-use position N is arranged at most at a height Z of 220 cm above the standing surfaces 18.

In order for the height of the conveying device 13 of the central conveying segment 4 to be adjusted, the conveying device 13 of the central conveying segment 4 is provided with two handles 20 for the manual height adjustment of the conveying device 13 of the central conveying segment 4. The operator can grip a handle 20 and raise the conveying device 13, and lower it again, purely mechanically. The handles 20 here, an illustration being given here only of the front handle 20, as seen in the viewing direction, are arranged on the opposite sides of the conveying device 13, as seen in a direction transverse to the conveyor track 16 or transverse to the conveying direction R, and therefore the operator can grip the conveying device 13 on both sides for raising or lowering purposes.

Figure 1B:
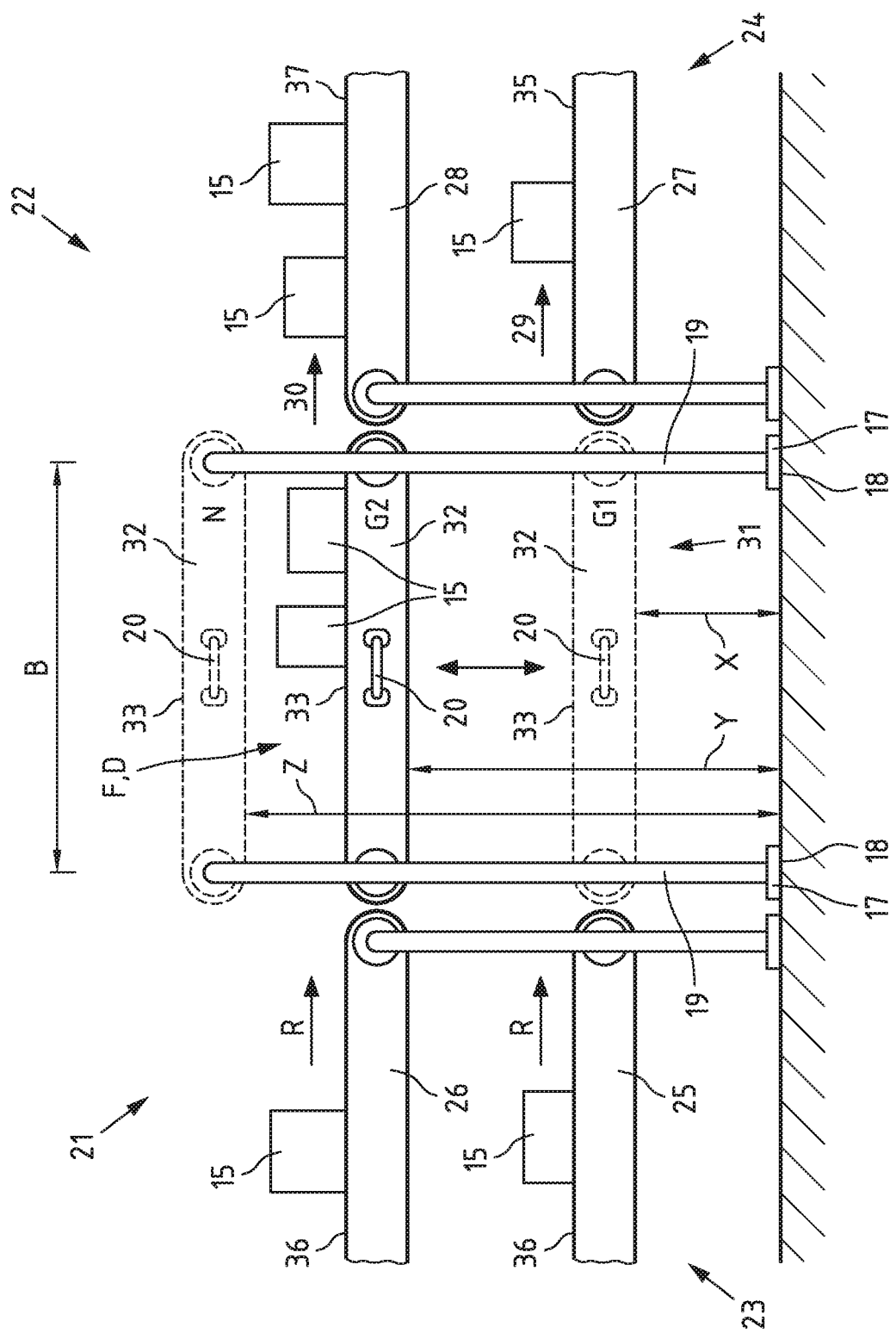

FIG. 1B illustrates a schematic side view of a further continuous conveyor 21 in an object-conveying facility 22. The continuous conveyor 21 of FIG. 1B is basically very similar to the continuous conveyor 1 of FIG. 1A, for which reason in particular the differences between the continuous conveyors 1,21 will be discussed hereinbelow. In addition, like components are provided with like reference signs in FIGS. 1A-B.

The front conveying segment 23 and the rear conveying segment 24 have in each case two conveying devices 25,26,27,28, which are arranged one above the other in each case. The conveying devices 25,26,27,28 of the front conveying segment 23 and of the rear conveying segment 24 here are assigned to different conveying planes and conveyor tracks 29,30. The central conveying segment 31 has a conveying device 32, which, in the exemplary embodiment which is illustrated, and to that extent preferred, can be adjusted from two lower, use positions G1,G2 into an upper, not-in-use position N, and back again. In the lower, use position G1, the conveying surface 33 of the conveying device 32 of the central conveying segment 31 is located approximately in a single plane and in alignment with the conveying surfaces 34,35 of the lower conveying devices 25,27 of the front conveying segment 23 and of the rear conveying segment 24. In the upper, use position G2, the conveying surface 33 of the conveying device 32 of the central conveying segment 31 is located approximately in a single plane and in alignment with the conveying surfaces 36,37 of the upper conveying devices 26,28 of the front conveying segment 23 and of the rear conveying segment 24.

The continuous conveyor 21 thus provides two different conveyor tracks 29,30 at different heights X,Y, in order to convey objects 15 in the conveying direction R from the front conveying segment 23, via the central conveying segment 31, to the rear conveying segment 24. It is possible here for the conveying device 32 of the central conveying segment 31 which is illustrated, and to that extent preferred, to have its conveying surface 33 arranged either approximately in the plane of the upper conveyor track 30 or approximately in the plane of the lower conveyor track 29. In the upper, not-in-use position N, the conveying device 32 of the central conveying segment 31 does not serve to convey objects 15 along a conveyor track 29,30, since the conveying surface 33 of the conveying device 32 of the central conveying segment 31 is arranged with a clear offset in height in relation to the conveying surfaces 34,37 of the other two conveying segments 23,24. With the conveying device 32 of the central conveying segment 31 in the upper, not-in-use position N, however, the continuous conveyor 21 provides a free space F beneath the conveying device 32 of the central conveying segment 31, and this free space can also be used as a through-passage D.

The dimensions and the configuration of the free space F are similar to the dimensions and the configuration of the free space F of the continuous conveyor 21 from FIG. 1A. In the case of the continuous conveyor from FIG. 1B, in other words, the conveying device 32 of the central conveying segment 31 in the not-in-use position N is provided such that a free space F extends beneath the conveying device 32 to the floor, that is to say the facility floor 11, said free space being at least 175 cm high, at least 90 cm wide and being as deep as the conveying device 32 is wide. It is therefore possible for the free space F beneath the conveying device 32 of the central conveying segment 31 to be used as a through-passage D. In the two use positions G1,G2 provided therebeneath, however, the space beneath the conveying device 32 of the central conveying segment 31 is not high enough in order for someone to stand or walk beneath the conveying device 32.

Figure 2:
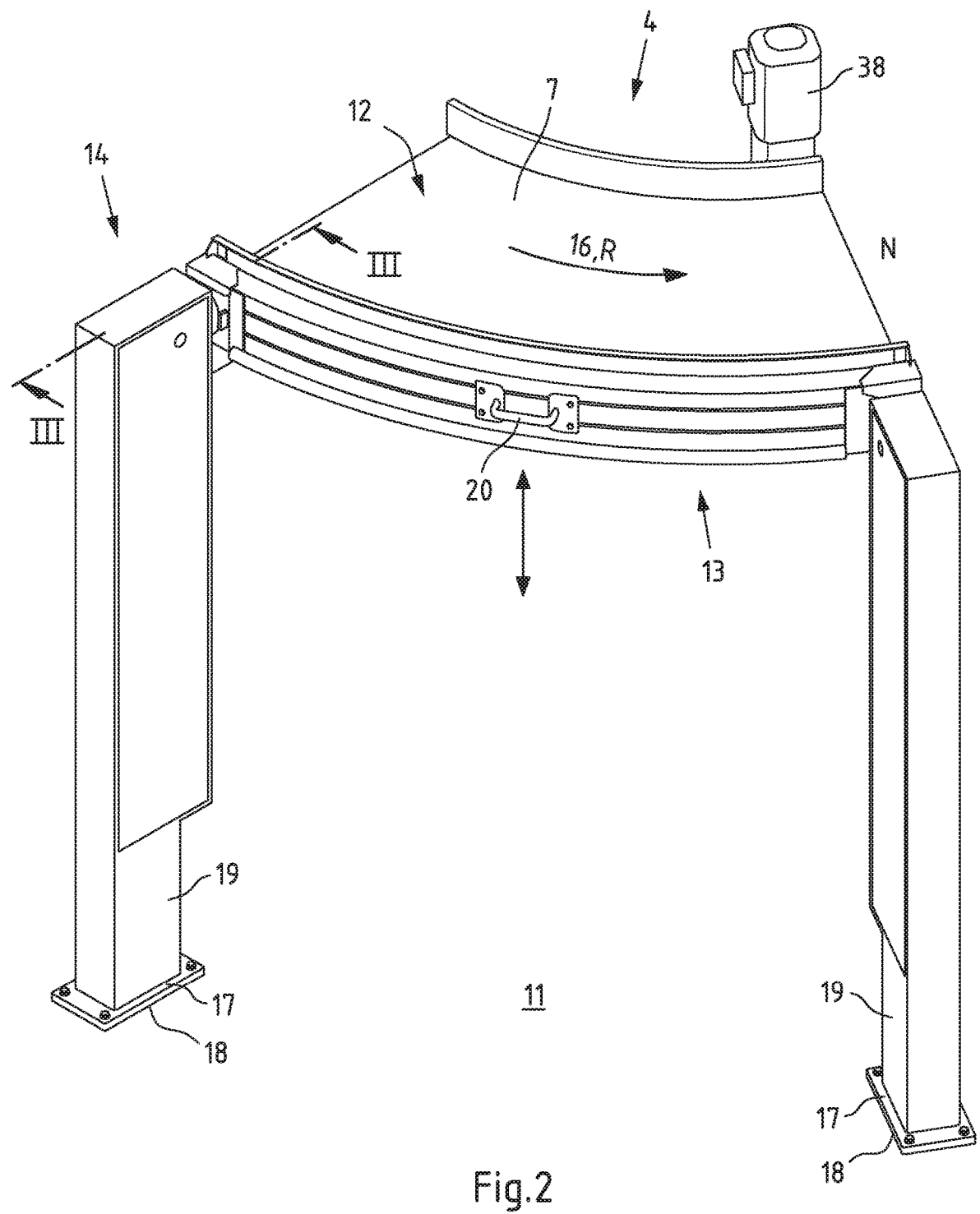
FIG. 2 shows a perspective view of the central conveying segment of the continuous conveyor from FIG. 1A, and FIGS. 3A-B show a vertical sectional view, taken along section plane from FIG. 2, of a detail of the central conveying segment from FIG. 2 in a lower, use position and in an upper position.

FIG. 2 illustrates a perspective view of the central conveying segment 4 of the continuous conveyor 1 from FIG. 1A. The central conveying segment 4, or the conveying device 13 thereof, is designed in the form of a belt conveyor and has a motor drive 38, which serves to drive the conveyor belt 7. The motor drive 38 here is designed in the form of part of the height-adjustable conveying device 13. The conveying device 13 can be adjusted in height, to be precise from the lower, use position G and the upper, not-in-use position N, with the aid of the height-adjustment device 14. For this purpose, the conveying device 13 has in each case one handle 20 on the opposite sides of the conveying device 13, as seen in respect of the conveyor track 16 or the conveying direction R of the objects 15 which are to be conveyed, it being possible for the conveying device 13 to be gripped, and raised or lowered, by said handle. In the case of the central conveying segment 4 which is illustrated, and to that extent preferred, the height-adjustment device 14 is designed in the form of a purely mechanical height-adjustment means 14, which therefore manages without any motor drive. In the case of the central conveying segment 4 which is illustrated, and to that extent preferred, the conveying device 13, and thus the conveyor track 16 of the conveyor device R, is curved at least essentially in the form of a circle arc, to be precise, further preferably, at least essentially in a horizontal plane. The objects 15 can thus be conveyed along a curve. In each case one leg 19 is assigned to the two ends of the conveying device 13, as seen in the conveying direction R or along the conveyor track 16. Each leg 19 has, at the lower end, a foot 17 with a standing surface 18, by way of which the foot 17 or the leg 19 stands on the underlying surface, in particular the facility floor 11.

Figure 3A:
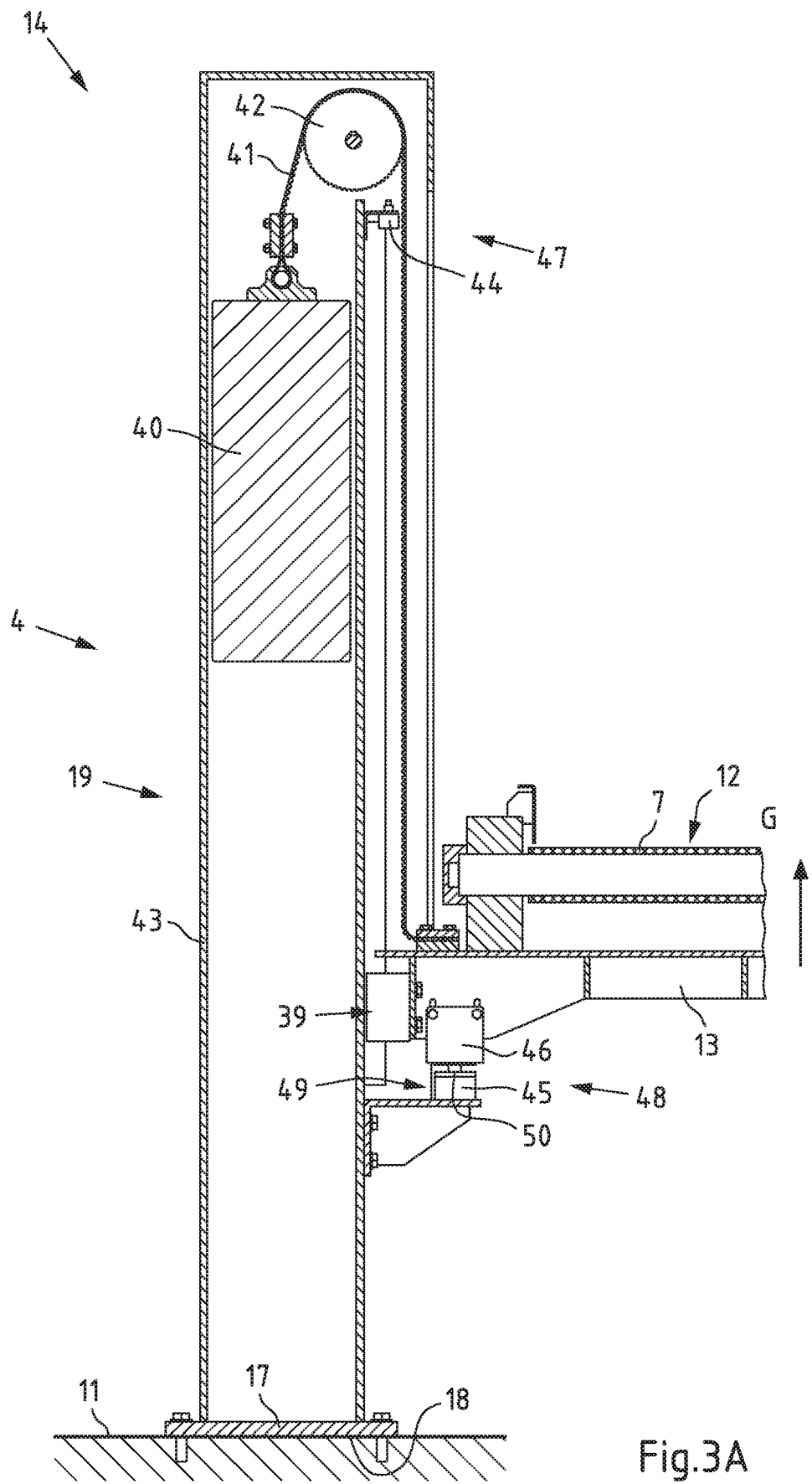
Figure 3B:
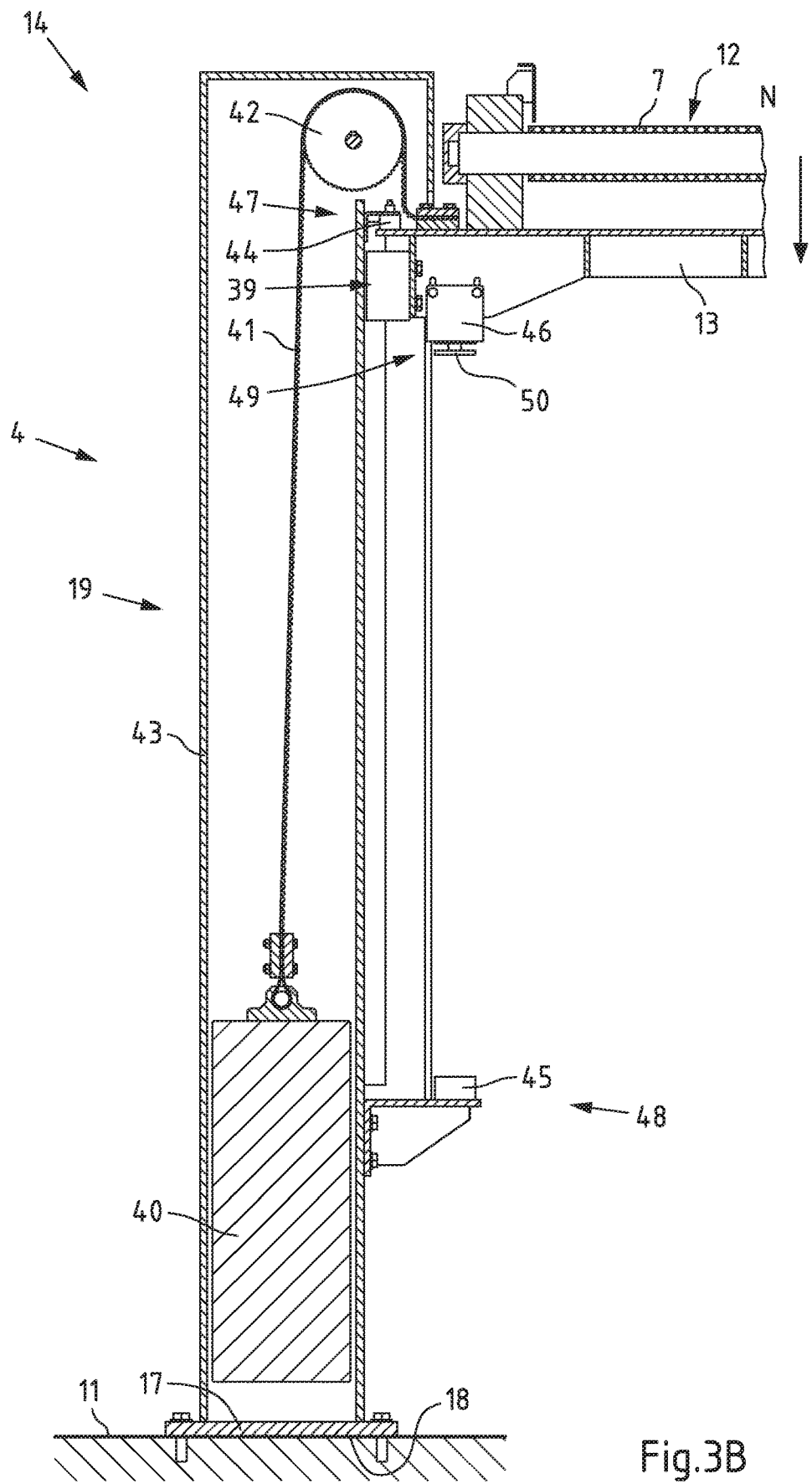

FIGS. 3A-B illustrate sectional views of a detail of the height-adjustment device 14. In FIG. 3A, the conveying device is located in the lower, use position G, whereas, in FIG. 3B, the conveying device 13 is located in the upper, not-in-use position N. The conveying device 13 is retained on in each case one rail system 39 of the legs 19. For adjustment of the height of the conveying device 13, the conveying device 13 can be pushed upwards and downwards along the rail system 39. The conveying device 13 is retained here at least essentially on the basis of counterweights 40, of which the weight is at least fairly similar to the weight of the conveying device 13. In the case of the continuous conveyor 1 which is illustrated, and to that extent preferred, the difference in weight between the counterweights 40 and the conveying device 13 is smaller than 20 kg.

The counterweights 40 are connected to the conveying device 13 via toothed belts 41, which are guided over correspondingly toothed deflecting rollers 42. The adjustment of the conveying device 13 is therefore countered by a certain amount of friction involved in the mounting of the deflecting roller 42. This friction and the difference in weight between the conveying device 13 and the counterweights 40 are dimensioned such that the force for raising the conveying device 13 into the upper, not-in-use position N, and for lowering the conveying device 13 into the lower, use position G, is less than 260 N. The counterweights 40 are arranged in the legs 19 and can travel upwards and downwards therein, depending on the adjustment of the conveying device 13. Since the counterweights 40 are accommodated entirely within the housings 43 of the legs 19, a reliable and defined height adjustment is possible. The central conveying segment 4 is positioned securely by the feet 17 of the central conveying segment being screw-connected to the facility floor 11.

In the case of the continuous conveyor 1 which is illustrated, and to that extent preferred, the conveying device 13 is retained reliably in the lower, use position G and in the upper, not-in-use position N. Consequently, there is no accidental height adjustment of the conveying device 13, nor any unavoidable personal injury. In the case of the continuous conveyor 1 which is illustrated, and to that extent preferred, the counterweights 40 are heavier than the conveying device 13 of the central conveying segment 4. Therefore, it is gravitational force which retains the conveying device 13 in the upper, not-in-use position N, in which the conveying device 13 butts against at least one upper end stop 44. The conveying device 13 is retained here on the at least one upper end stop 44 by gravitational force. If the operator lets go of the handle 20 following just partial adjustment in the direction of the upper, not-in-use position N, or of the lower, use position G, the conveying device 13 adjusts automatically into the upper, not-in-use position N. However, the limited difference in weight between the conveying device 13 and the counterweights 40 means that this adjustment takes place fairly slowly, and therefore people cannot be injured accidentally.

In the lower, use position G, in contrast, at least one lower end stop 45 is provided and, in the lower, use position G, the conveying device 13 is retained on said end stop as a result of a magnetic force. Accidental adjustment of the conveying device 13 in the upward direction is avoided in this way. For this purpose, the conveying device 13 has at least one magnet 46, which in the lower, use position G interacts with the lower end stop 45. However, the magnetic force is not large enough to prevent the conveying device 13 from being readily adjusted manually upwards into the not-in-use position N. The central conveying segment 4 therefore has automatic arresting devices 47,48 for automatically arresting the conveying device 13 of the central conveying segment 4 in the lower, use position G and in the upper, not-in-use position N.

As soon as the conveying device 13 is raised to some extent in relation to the lower, use position G, the magnetic force between the at least one lower end stop 45 and the at least one magnet 46 quickly decreases. It would also be possible, in principle, for the magnet 46 to be provided on the height-adjustment device 14 and to interact with the conveying device 13 when the conveying device 13 is located in the lower, use position G.

It is also possible to provide a switch 49, which is closed in the lower, use position G of the conveying device 13 and is open in the upper, not-in-use position N of the conveying device 13. It is thus possible for forced shutdown of the continuous conveyor 1 or of the central conveying segment 4 to be achieved merely by virtue of the conveying device 13 being raised. In the case of the continuous conveyor 1 which is illustrated, and to that extent preferred, the magnet 46 is provided with a pushbutton 50, which in the lower, use position G is retained in a pushed-in state by virtue of the conveying device 13 butting against the lower end stop 45. In the upper, not-in-use position N, the pushbutton 50 hangs freely downwards as a result of gravitational force and is therefore not in a pushed-in state. The switch 49 in this case is open, whereas the switch 49 can be closed by virtue of the pushbutton 50 being pushed in.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A continuous conveyor, in particular belt conveyor or roller conveyor, for conveying objects, comprising:
   a front conveying segment,
   a central conveying segment, and
   a rear conveying segment,
   wherein at least the central conveying segment has a
      conveying device for conveying objects and at least one
      height-adjustment device for adjusting the height of at least the conveying device from at least one lower, use position for conveying objects into an upper position in relation to the front conveying segment and the rear conveying segment, wherein, in a conveying position, the front conveying segment, the conveying device of the central conveying segment and the rear conveying segment are arranged one behind the other in at least one conveying direction, wherein a free space, in particular a through-passage, is provided beneath the conveying device of the central conveying segment in the upper position, said free space having a height of at least 160 cm, preferably at least 175 cm, in particular at least 190 cm, a width of at least 70 cm, preferably at least 90 cm, in particular at least 110 cm, and a depth corresponding to the width of the conveying device of the central conveying segment, and wherein the height-adjustment device has at least one counterweight for at least partially compensating for the weight of the conveying device of the central conveying segment when the conveying device is being adjusted from the lower, use position into the upper position, and back, wherein the height adjustment device for adjusting the height of the conveyor device of the central conveyor segment is designed in the form of a purely mechanical height adjustment device for purely mechanical, manual height adjustment of the conveyor device of the central conveyor segment, and wherein the conveying device of the central conveying segment has at least one handle for the manual height adjustment of the conveying device of the central conveying segment, and wherein the conveying device of the central conveying segment has in each case at least one handle for the manual height adjustment of the conveying device of the central conveying segment on opposite sides as seen in respect of the conveyor track for conveying objects.

2. The continuous conveyor according to claim 1, wherein at least one conveying surface of the front conveying segment, at least one conveying surface of the conveying device of the central conveying segment in the lower, use position and at least one conveying surface of the rear conveying segment form an at least essentially continuous conveyor track for conveying objects from the front conveying segment, via the central conveying segment, to the rear conveying segment.

3. The continuous conveyor according to claim 1, wherein the upper position of the conveying device of the central conveying segment is a not-in-use position, in which objects are not conveyed, and wherein, preferably, the at least one conveying surface of the conveying device of the central conveying segment in the upper position together with the conveying surfaces of the front conveying segment and of the rear conveying segment do not form an at least essentially continuous conveyor track for conveying objects from the front conveying segment, via the central conveying segment, to the rear conveying segment.

4. The continuous conveyor according to claim 1, wherein at least one foot with a standing surface, said foot being assigned in particular to the central conveying segment, is provided for positioning the continuous conveyor on an underlying surface, and/or wherein at least part of an underside of the conveying device of the central conveying segment in the upper position is arranged at least 160 cm, preferably at least 175 cm, in particular at least 190 cm above the standing surface, and/or wherein at least part of the underside of the conveying device of the central conveying segment in the upper position is arranged at most 240 cm, preferably at most 220 cm, in particular at most 200 cm above the standing surface.

5. The continuous conveyor according to claim 1, wherein the central conveying segment has in each case at least one leg at the front and rear, as seen in the conveying direction of the objects, and wherein, preferably, the length of the legs beneath a portion of the conveying device which extends between the legs is at least 160 cm, preferably at least 175 cm, in particular at least 190 cm long.

6. The continuous conveyor according to claim 1, wherein the central conveying segment has at least one automatic arresting device for automatically arresting the conveying device of the central conveying segment in the lower, use position and/or in the upper position.

7. The continuous conveyor according to claim 1, wherein the height-adjustment device is designed such that the operation of raising the conveying device from the lower, use position into the upper position and/or the operation of lowering the same from the upper position into the lower, use position require/requires a force of less than 300 N, preferably less than 260 N, in particular less than 220 N.

8. The continuous conveyor according to claim 1, wherein the conveying device of the central conveying segment is designed to be rectilinear or curved along the conveyor track and/or the conveying direction of the conveying device of the central conveying segment.

9. The continuous conveyor according to claim 1, wherein the conveying device of the central conveying segment has a motor drive for driving the conveying device for conveying the objects.

10. The continuous conveyor according to claim 1, wherein the conveying device of the central conveying segment has a roller conveyor and/or a belt conveyor.

11. The continuous conveyor according to claim 1, wherein the front conveying segment, if required a conveying device of the front conveying segment, and/or the rear conveying segment, if required a conveying device of the rear conveying segment, have/has a roller conveyor and/or a belt conveyor, and/or wherein the front conveying segment has a height-adjustment device for adjusting the height of the conveying device of the front conveying segment and/or the rear conveying segment has a height-adjustment device for adjusting the height of the conveying device of the rear conveying segment.

12. An object-conveying facility comprising:
at least one continuous conveyor according to claim 1,
wherein a through-passage is provided, in particular in a direction transverse to the conveyor track and/or conveying direction, beneath the conveying device of the central conveying segment in the upper position, said through-passage having a height of at least 160 cm, preferably at least 175 cm, in particular at least 190 cm, and a width of at least 70 cm, preferably at least 90 cm, in particular at least 110 cm, and a depth corresponding to the width of the conveying device of the central conveying segment.

13. The object-conveying facility according to claim 12, wherein at least part of the underside of the conveying device of the central conveying segment in the upper position is arranged at least 160 cm, preferably at least 175 cm, in particular at least 190 cm above the floor of the object-conveying facility beneath the conveying device, and/or wherein at least part of the underside of the conveying device of the central conveying segment in the upper position is arranged at most 240 cm, preferably at most 220 cm, in particular at most 200 cm above the floor of the object-conveying facility beneath the conveying device.

14. A continuous conveyor, in particular belt conveyor or roller conveyor, for conveying objects, comprising:
a front conveying segment,
a central conveying segment, and
a rear conveying segment,
wherein at least the central conveying segment has a conveying device for conveying objects and at least one height-adjustment device for adjusting the height of at least the conveying device from at least one lower, use position for conveying objects into an upper position in relation to the front conveying segment and the rear conveying segment,
wherein, in a conveying position, the front conveying segment, the conveying device of the central conveying segment and the rear conveying segment are arranged one behind the other in at least one conveying direction,
wherein a free space, in particular a through-passage, is provided beneath the conveying device of the central conveying segment in the upper position, said free space having a height of at least 160 cm, preferably at least 175 cm, in particular at least 190 cm, a width of at least 70 cm, preferably at least 90 cm, in particular at least 110 cm, and a depth corresponding to the width of the conveying device of the central conveying segment, and
wherein the height-adjustment device has at least one counterweight for at least partially compensating for the weight of the conveying device of the central conveying segment when the conveying device is being adjusted from the lower, use position into the upper position, and back, and wherein, preferably, the difference in mass between the conveying device and the at least one counterweight is less than 20 kg, preferably less than 15 kg, in particular less than 10 kg,
wherein the height adjustment device for adjusting the height of the conveyor device of the central conveyor segment is designed in the form of a purely mechanical height adjustment device for purely mechanical, manual height adjustment of the conveyor device of the central conveyor segment, and wherein the conveying device of the central conveying segment has at least one handle for the manual height adjustment of the conveying device of the central conveying segment, and wherein the conveying device of the central conveying segment has in each case at least one handle for the manual height adjustment of the conveying device of the central conveying segment on opposite sides as seen in respect of the conveyor track for conveying objects.

* * * * *